United States Patent
Foster et al.

(10) Patent No.: US 10,476,597 B2
(45) Date of Patent: Nov. 12, 2019

(54) DATA TRANSFER FACILITATION ACROSS A DISTRIBUTED MESH NETWORK USING LIGHT AND OPTICAL BASED TECHNOLOGY

(71) Applicant: Delta Energy & Communications, Inc., Murrieta, CA (US)

(72) Inventors: Scott Foster, Murrieta, CA (US); Keith Teichmann, Newton Centre, MA (US)

(73) Assignee: Delta Energy & Communications, Inc., Murrieta, CA (US)

( * ) Notice: Subject to any disclaimer, the term of this patent is extended or adjusted under 35 U.S.C. 154(b) by 0 days.

(21) Appl. No.: 15/332,151

(22) Filed: Oct. 24, 2016

(65) Prior Publication Data

US 2017/0134092 A1     May 11, 2017

Related U.S. Application Data

(60) Provisional application No. 62/244,919, filed on Oct. 22, 2015.

(51) Int. Cl.
*H04B 10/27* (2013.01)
*H04B 10/11* (2013.01)
*H04B 10/40* (2013.01)

(52) U.S. Cl.
CPC ............. *H04B 10/27* (2013.01); *H04B 10/11* (2013.01); *H04B 10/40* (2013.01)

(58) Field of Classification Search
CPC ......... H04B 10/27; H04B 10/11; H04B 10/40
(Continued)

(56) References Cited

U.S. PATENT DOCUMENTS

| 2,704,809 A | 3/1955 | Williams |
| 4,724,381 A | 2/1988 | Crimmins |

(Continued)

FOREIGN PATENT DOCUMENTS

| CN | 101860978 | 10/2010 |
| CN | 102255869 | 11/2011 |

(Continued)

OTHER PUBLICATIONS

Detlef Zuehlke, "SmartFactory—Towards a factory-of-things." Annual Reviews in Control, 34.1, Mar. 28, 2010, pp. 129-138.
(Continued)

*Primary Examiner* — Oommen Jacob
(74) *Attorney, Agent, or Firm* — Ware, Fressola, Maguire & Barber LLP (57) ABSTRACT

A transformer monitoring device for a smart grid network is provided, which is configured to transmit and receive optical signaling between other transformer monitoring devices and other devices in the smart grid network. The transformer monitoring device includes a receiver configured to receive optical signaling, a signal processor and a transmitter configured to transmit optical signaling. The signal processor is configured to receive optical signaling from the receiver, which contains information about collected data, including data related to electrical signaling being processed by a transformer located and arranged in a grid network or metered data related to associated signaling being provided from the transformer to a building or structure in the grid network and determine corresponding optical signaling containing information about the collected data for transmitting back to a central location or other connected device for further processing, based upon the signaling received.

20 Claims, 5 Drawing Sheets

(58) Field of Classification Search
USPC .................................... 398/118, 120, 130
See application file for complete search history.

(56) References Cited

U.S. PATENT DOCUMENTS

| | | | |
|---|---|---|---|
| 5,426,360 A | 6/1995 | Maraio et al. | |
| 5,748,104 A | 5/1998 | Argyroudis et al. | |
| 5,940,009 A | 8/1999 | Loy et al. | |
| 6,018,449 A | 1/2000 | Nelson et al. | |
| 6,211,764 B1 | 4/2001 | Schweitzer, Jr. | |
| 6,300,881 B1 | 10/2001 | Yee et al. | |
| 6,549,120 B1 | 4/2003 | de Buda | |
| 6,711,512 B2 | 3/2004 | Noh | |
| 6,829,491 B1 | 12/2004 | Yea et al. | |
| 6,856,256 B2 | 2/2005 | Winkler | |
| 6,880,086 B2 | 4/2005 | Kidder et al. | |
| 6,906,630 B2 | 6/2005 | Georges et al. | |
| 6,998,962 B2 | 2/2006 | Cope et al. | |
| 7,049,976 B2 | 5/2006 | Hunt et al. | |
| 7,054,770 B2 | 5/2006 | Swarztrauber et al. | |
| 7,058,524 B2 | 6/2006 | Hayes et al. | |
| 7,107,329 B1 | 9/2006 | Schroder et al. | |
| 7,126,558 B1 | 10/2006 | Dempski | |
| 7,271,735 B2 | 9/2007 | Rogai | |
| 7,304,587 B2 | 12/2007 | Boaz | |
| 7,310,052 B2 * | 12/2007 | Bowman ................ | G01D 4/004 340/531 |
| 7,402,993 B2 | 7/2008 | Morrison | |
| 7,440,436 B2 | 10/2008 | Cheng et al. | |
| 7,496,078 B2 | 2/2009 | Rahman | |
| 7,733,839 B1 | 6/2010 | Frank et al. | |
| 7,747,534 B2 | 6/2010 | Villicana et al. | |
| 7,764,943 B2 | 7/2010 | Radtke | |
| 7,894,371 B2 | 2/2011 | Bonta et al. | |
| 7,936,163 B2 | 5/2011 | Lee, Jr. | |
| 7,940,039 B2 | 5/2011 | de Buda | |
| 7,961,740 B2 | 6/2011 | Flammer, III et al. | |
| 8,054,199 B2 | 11/2011 | Addy | |
| 8,060,259 B2 | 11/2011 | Budhraja et al. | |
| 8,121,741 B2 | 2/2012 | Taft et al. | |
| 8,145,732 B2 | 3/2012 | Kumar et al. | |
| 8,194,275 B2 | 6/2012 | Furst et al. | |
| 8,279,870 B2 | 10/2012 | Flammer, III et al. | |
| 8,305,932 B2 | 11/2012 | Qiu et al. | |
| 8,311,863 B1 | 11/2012 | Kemp | |
| 8,370,697 B2 | 2/2013 | Veillette | |
| 8,373,575 B2 * | 2/2013 | Boettner ................ | H04Q 9/00 340/531 |
| 8,385,978 B2 | 2/2013 | Leung et al. | |
| 8,401,709 B2 | 3/2013 | Cherian et al. | |
| 8,412,735 B2 | 4/2013 | Yeh et al. | |
| 8,423,637 B2 | 4/2013 | Vaswani et al. | |
| 8,428,021 B2 | 4/2013 | Karunakaran et al. | |
| 8,437,883 B2 | 5/2013 | Powell et al. | |
| 8,441,372 B2 | 5/2013 | Smith et al. | |
| 8,452,555 B2 | 5/2013 | Swarztrauber et al. | |
| 8,509,953 B2 | 8/2013 | Taft | |
| 8,543,250 B2 | 9/2013 | Seo et al. | |
| 8,553,561 B1 | 10/2013 | Chokshi et al. | |
| 8,566,046 B2 | 10/2013 | Deaver, Sr. | |
| 8,583,520 B1 | 11/2013 | Forbes, Jr. | |
| 8,600,572 B2 | 12/2013 | Sri-Jayantha | |
| 8,660,868 B2 | 2/2014 | Vogel et al. | |
| 8,755,303 B2 | 6/2014 | Hughes et al. | |
| 8,792,626 B2 | 7/2014 | Cook et al. | |
| 8,847,826 B2 | 9/2014 | Rao et al. | |
| 8,855,102 B2 | 10/2014 | Borleske et al. | |
| 8,862,281 B2 | 10/2014 | Yoneda et al. | |
| 8,874,477 B2 | 10/2014 | Hoffberg | |
| 8,880,234 B2 | 11/2014 | Sekoguchi et al. | |
| 8,909,358 B2 | 12/2014 | Kamouskos | |
| 8,917,716 B2 | 12/2014 | Tran | |
| 8,937,497 B1 | 1/2015 | Tobin | |
| 8,959,114 B2 | 2/2015 | Rehman | |
| 8,963,807 B1 | 2/2015 | Lee et al. | |
| 8,964,757 B2 | 2/2015 | Watson et al. | |
| 8,965,590 B2 | 2/2015 | Boardman et al. | |
| 8,970,394 B2 | 3/2015 | Veillette | |
| 9,002,670 B2 | 4/2015 | Hurri et al. | |
| 9,013,173 B2 | 4/2015 | Veillette | |
| 9,014,996 B2 | 4/2015 | Kamel et al. | |
| 9,031,116 B2 | 5/2015 | Young et al. | |
| 9,043,174 B2 | 5/2015 | Arya et al. | |
| 9,052,216 B2 | 6/2015 | Kamel et al. | |
| 9,087,451 B1 | 7/2015 | Jarrell | |
| 9,110,101 B2 | 8/2015 | Pietrowicz et al. | |
| 9,112,381 B2 | 8/2015 | Carralero et al. | |
| 9,118,219 B2 | 8/2015 | Booth | |
| 9,129,355 B1 | 9/2015 | Harvey et al. | |
| 9,141,653 B2 | 9/2015 | Zhou et al. | |
| 9,144,082 B2 | 9/2015 | Rubin et al. | |
| 9,162,753 B1 | 10/2015 | Panto et al. | |
| 9,400,192 B1 | 7/2016 | Salser, Jr. et al. | |
| 9,400,867 B2 | 7/2016 | Boyd et al. | |
| 9,402,292 B1 | 7/2016 | Gordin et al. | |
| 9,451,060 B1 | 9/2016 | Bowers et al. | |
| 9,500,716 B2 | 11/2016 | Turner et al. | |
| 9,654,173 B2 | 5/2017 | Barzegar et al. | |
| 2001/0038342 A1 | 11/2001 | Foote | |
| 2002/0046368 A1 | 4/2002 | Friedrich et al. | |
| 2002/0064010 A1 | 5/2002 | Nelson et al. | |
| 2003/0050737 A1 | 3/2003 | Osann, Jr. | |
| 2003/0078996 A1 | 4/2003 | Baldwin | |
| 2003/0128149 A1 | 7/2003 | Miceli et al. | |
| 2004/0082203 A1 | 4/2004 | Logvinov et al. | |
| 2005/0078624 A1 | 4/2005 | Shu et al. | |
| 2005/0088299 A1 | 4/2005 | Bandy et al. | |
| 2006/0007016 A1 | 1/2006 | Borkowski et al. | |
| 2006/0056363 A1 | 3/2006 | Ratiu et al. | |
| 2006/0141940 A1 * | 6/2006 | Bloom .................... | G01D 4/002 455/73 |
| 2006/0145834 A1 | 7/2006 | Berkman et al. | |
| 2007/0043849 A1 | 2/2007 | Lill et al. | |
| 2007/0048702 A1 | 3/2007 | Jang et al. | |
| 2007/0088630 A1 | 4/2007 | MacLeod et al. | |
| 2008/0065342 A1 | 3/2008 | Zalitzky et al. | |
| 2008/0100436 A1 | 5/2008 | Banting et al. | |
| 2008/0109387 A1 | 5/2008 | Deaver et al. | |
| 2008/0317047 A1 | 12/2008 | Zeng et al. | |
| 2009/0003662 A1 | 1/2009 | Joseph et al. | |
| 2009/0088907 A1 | 4/2009 | Lewis et al. | |
| 2009/0102680 A1 * | 4/2009 | Roos ...................... | G01D 4/008 340/870.02 |
| 2009/0111456 A1 * | 4/2009 | Shaffer ................. | H04W 36/30 455/422.1 |
| 2009/0146839 A1 | 6/2009 | Reddy et al. | |
| 2009/0167558 A1 | 7/2009 | Borleske et al. | |
| 2009/0187284 A1 | 7/2009 | Kreiss et al. | |
| 2009/0240449 A1 | 9/2009 | Gibala et al. | |
| 2009/0267792 A1 | 10/2009 | Crichlow | |
| 2010/0074176 A1 | 3/2010 | Flammer, III et al. | |
| 2010/0278187 A1 | 11/2010 | Hart et al. | |
| 2010/0313146 A1 | 12/2010 | Nielsen et al. | |
| 2011/0026500 A1 * | 2/2011 | Shaffer ............... | H04W 40/246 370/338 |
| 2011/0047230 A1 | 2/2011 | McGee | |
| 2011/0066297 A1 | 3/2011 | Saberi et al. | |
| 2011/0090833 A1 | 4/2011 | Kneckt et al. | |
| 2011/0208367 A1 | 8/2011 | Sackman et al. | |
| 2012/0007885 A1 | 1/2012 | Huston | |
| 2012/0029897 A1 | 2/2012 | Cherian et al. | |
| 2012/0050971 A1 | 3/2012 | Seal et al. | |
| 2012/0058790 A1 | 3/2012 | Junnell et al. | |
| 2012/0059609 A1 | 3/2012 | Oh et al. | |
| 2012/0078686 A1 | 3/2012 | Bashani | |
| 2012/0089268 A1 | 4/2012 | Torre et al. | |
| 2012/0092114 A1 | 4/2012 | Matthews | |
| 2012/0106394 A1 * | 5/2012 | Apostolakis ............ | H04L 69/18 370/254 |
| 2012/0126790 A1 | 5/2012 | Sobotka et al. | |
| 2012/0126994 A1 | 5/2012 | Sobotka et al. | |
| 2012/0131324 A1 | 5/2012 | Ansari et al. | |
| 2012/0229089 A1 | 9/2012 | Bemmel et al. | |

(56) References Cited

U.S. PATENT DOCUMENTS

| | | |
|---|---|---|
| 2012/0229296 A1* | 9/2012 | Ree .................. G01D 4/002 340/870.02 |
| 2012/0230237 A1 | 9/2012 | Gong et al. |
| 2012/0242698 A1 | 9/2012 | Haddick et al. |
| 2012/0249741 A1 | 10/2012 | Maciocci et al. |
| 2012/0253881 A1 | 10/2012 | Schneider et al. |
| 2012/0265355 A1 | 10/2012 | Bernheim et al. |
| 2012/0277926 A1 | 11/2012 | Nielsen et al. |
| 2012/0303746 A1 | 11/2012 | Yu et al. |
| 2012/0316688 A1 | 12/2012 | Boardman et al. |
| 2012/0316696 A1 | 12/2012 | Boardman et al. |
| 2013/0026986 A1 | 1/2013 | Parthasarathy et al. |
| 2013/0035802 A1 | 2/2013 | Khaitan et al. |
| 2013/0069985 A1 | 3/2013 | Wong et al. |
| 2013/0077610 A1 | 3/2013 | Amini et al. |
| 2013/0103660 A1 | 4/2013 | Welsh et al. |
| 2013/0106617 A1 | 5/2013 | Heo et al. |
| 2013/0110837 A1 | 5/2013 | Dai et al. |
| 2013/0123998 A1 | 5/2013 | King et al. |
| 2013/0190939 A1 | 7/2013 | Lenox |
| 2013/0203378 A1 | 8/2013 | Vos et al. |
| 2013/0218495 A1 | 8/2013 | Boone et al. |
| 2013/0222215 A1 | 8/2013 | Kobayashi |
| 2013/0223334 A1* | 8/2013 | Guo .................. H04W 84/18 370/328 |
| 2013/0278437 A1 | 10/2013 | Wyk |
| 2013/0278631 A1 | 10/2013 | Border et al. |
| 2013/0289782 A1 | 10/2013 | Giroti |
| 2013/0297087 A1 | 11/2013 | Koster et al. |
| 2013/0297239 A1 | 11/2013 | Arya et al. |
| 2013/0297868 A1 | 11/2013 | Yin et al. |
| 2013/0304264 A1 | 11/2013 | Shao |
| 2013/0335062 A1 | 12/2013 | de Buda et al. |
| 2014/0067330 A1 | 3/2014 | Flammer, III |
| 2014/0092765 A1 | 4/2014 | Agarwal et al. |
| 2014/0098685 A1 | 4/2014 | Shattil |
| 2014/0129160 A1 | 5/2014 | Tran |
| 2014/0167977 A1 | 6/2014 | Bean et al. |
| 2014/0172133 A1 | 6/2014 | Snyder |
| 2014/0183964 A1 | 7/2014 | Walley |
| 2014/0233620 A1 | 8/2014 | Bernheim et al. |
| 2014/0237525 A1 | 8/2014 | Rothschild et al. |
| 2014/0241354 A1 | 8/2014 | Shuman et al. |
| 2014/0244017 A1 | 8/2014 | Freiwirth et al. |
| 2014/0244768 A1 | 8/2014 | Shuman et al. |
| 2014/0244833 A1 | 8/2014 | Sharma et al. |
| 2014/0259108 A1 | 9/2014 | Clark et al. |
| 2014/0267400 A1 | 9/2014 | Mabbutt et al. |
| 2014/0270749 A1 | 9/2014 | Miniscalo et al. |
| 2014/0277813 A1 | 9/2014 | Powell et al. |
| 2014/0279694 A1 | 9/2014 | Gauger et al. |
| 2014/0289004 A1 | 9/2014 | Monforte et al. |
| 2014/0297206 A1 | 10/2014 | Silverman |
| 2014/0300210 A1* | 10/2014 | Abi-Ackel .............. H04Q 9/00 307/130 |
| 2014/0300344 A1 | 10/2014 | Turner et al. |
| 2014/0306525 A1 | 10/2014 | Greer et al. |
| 2014/0312802 A1 | 10/2014 | Recker et al. |
| 2014/0320306 A1* | 10/2014 | Winter .................. G01D 4/004 340/870.02 |
| 2014/0328597 A1* | 11/2014 | Bhide ................ H04B 10/1121 398/118 |
| 2014/0334073 A1* | 11/2014 | Thompson .............. H02G 7/00 361/660 |
| 2014/0358315 A1* | 12/2014 | Liu .................. H02J 13/00 700/297 |
| 2014/0361907 A1 | 12/2014 | Bernheim et al. |
| 2014/0368189 A1 | 12/2014 | Bernheim et al. |
| 2014/0371941 A1 | 12/2014 | Keller et al. |
| 2014/0372583 A1 | 12/2014 | Tseng |
| 2014/0376405 A1 | 12/2014 | Erickson et al. |
| 2014/0376914 A1 | 12/2014 | Miniscalo |
| 2014/0380488 A1 | 12/2014 | Datta Ray et al. |
| 2015/0002186 A1 | 1/2015 | Taft |
| 2015/0019342 A1 | 1/2015 | Gupta |
| 2015/0019553 A1 | 1/2015 | Shaashua et al. |
| 2015/0058445 A1 | 2/2015 | Choi et al. |
| 2015/0063202 A1 | 3/2015 | Mazzarella et al. |
| 2015/0066772 A1 | 3/2015 | Griffin et al. |
| 2015/0094874 A1 | 4/2015 | Hall et al. |
| 2015/0094968 A1 | 4/2015 | Jia et al. |
| 2015/0095936 A1 | 4/2015 | Yu et al. |
| 2015/0112469 A1 | 4/2015 | Da Silva Neto et al. |
| 2015/0121470 A1 | 4/2015 | Rongo et al. |
| 2015/0127601 A1 | 5/2015 | McGill et al. |
| 2015/0142963 A1 | 5/2015 | Choi et al. |
| 2015/0148979 A1 | 5/2015 | Forbes, Jr. |
| 2015/0149396 A1 | 5/2015 | Arya et al. |
| 2015/0155713 A1 | 6/2015 | Forbes, Jr. |
| 2015/0163849 A1 | 6/2015 | Bauer et al. |
| 2015/0179062 A1 | 6/2015 | Ralston et al. |
| 2015/0200713 A1 | 7/2015 | Hui et al. |
| 2015/0200846 A1 | 7/2015 | Hui et al. |
| 2015/0220762 A1 | 8/2015 | Jiang et al. |
| 2015/0249595 A1 | 9/2015 | Geiger |
| 2015/0256433 A1 | 9/2015 | Sum et al. |
| 2015/0256435 A1 | 9/2015 | Sum et al. |
| 2015/0276433 A1 | 10/2015 | Brahmajosyula et al. |
| 2015/0281996 A1 | 10/2015 | Rubin et al. |
| 2015/0288532 A1 | 10/2015 | Veyseh et al. |
| 2015/0288825 A1 | 10/2015 | Cook |
| 2015/0294557 A1 | 10/2015 | Willig et al. |
| 2015/0311951 A1 | 10/2015 | Hariz |
| 2015/0370615 A1 | 12/2015 | Pi-Sunyer |
| 2015/0373521 A1 | 12/2015 | Olesen et al. |
| 2015/0373641 A1 | 12/2015 | Yamana et al. |
| 2016/0029384 A1 | 1/2016 | Sidhu et al. |
| 2016/0081127 A1 | 3/2016 | Lee et al. |
| 2016/0094402 A1 | 3/2016 | Finkelstein |
| 2016/0134932 A1 | 5/2016 | Karp et al. |
| 2016/0205106 A1 | 7/2016 | Yacoub et al. |
| 2016/0214715 A1 | 7/2016 | Meffert |
| 2016/0261425 A1 | 9/2016 | Horton et al. |
| 2016/0292205 A1 | 10/2016 | Massey et al. |
| 2016/0327603 A1 | 11/2016 | Sonderegger et al. |
| 2016/0360361 A1 | 12/2016 | Ross et al. |
| 2016/0366461 A1 | 12/2016 | Hu et al. |
| 2017/0003142 A1 | 1/2017 | Allcorn et al. |
| 2017/0108236 A1 | 4/2017 | Guan et al. |
| 2017/0134092 A1* | 5/2017 | Foster .................. H04B 10/11 |
| 2017/0223807 A1 | 8/2017 | Recker et al. |
| 2017/0339536 A1 | 11/2017 | Lewis et al. |
| 2018/0267494 A1* | 9/2018 | Meranda .............. G06Q 10/20 |
| 2018/0366978 A1 | 12/2018 | Matan et al. |

FOREIGN PATENT DOCUMENTS

| | | |
|---|---|---|
| CN | 102355682 | 2/2012 |
| CN | 102412530 | 4/2012 |
| CN | 102508989 | 6/2012 |
| CN | 202513670 | 10/2012 |
| CN | 103078673 | 5/2013 |
| CN | 103209385 | 7/2013 |
| CN | 103313437 | 9/2013 |
| CN | 103488988 | 1/2014 |
| CN | 103810753 | 5/2014 |
| CN | 203965904 | 11/2014 |
| CN | 104238730 | 12/2014 |
| CN | 104333733 | 2/2015 |
| CN | 204142366 | 2/2015 |
| CN | 204203734 | 3/2015 |
| CN | 104485746 | 4/2015 |
| CN | 104581087 | 4/2015 |
| CN | 204465736 | 7/2015 |
| CN | 204595654 | 8/2015 |
| EP | 2296069 | 3/2011 |
| EP | 2818878 | 12/2014 |
| EP | 2721772 | 10/2015 |
| KR | 20130108769 A | 10/2013 |
| WO | 2009059386 | 5/2009 |
| WO | 2010003452 | 1/2010 |
| WO | 2011079358 | 7/2011 |
| WO | 2012047089 | 4/2012 |

(56) References Cited

FOREIGN PATENT DOCUMENTS

| | | |
|---|---|---|
| WO | 2012122454 | 9/2012 |
| WO | 2012142586 | 10/2012 |
| WO | 2012154938 | 11/2012 |
| WO | 2012155126 | 11/2012 |
| WO | 2013019595 | 2/2013 |
| WO | 2013028407 | 2/2013 |
| WO | 2013123445 | 8/2013 |
| WO | 2013173230 | 11/2013 |
| WO | 2014056558 | 4/2014 |
| WO | 2014091434 | 6/2014 |
| WO | 2014118622 | 8/2014 |
| WO | 2014123737 | 8/2014 |
| WO | 2014124318 | 8/2014 |
| WO | 2014130568 | 8/2014 |
| WO | 2014169018 | 10/2014 |
| WO | 2014175721 | 10/2014 |
| WO | 2015032164 | 3/2015 |
| WO | 2015046695 | 4/2015 |
| WO | 2015073687 | 5/2015 |
| WO | 2015105658 | 7/2015 |
| WO | 2015123623 | 8/2015 |
| WO | 2015131462 | 9/2015 |
| WO | 2015138447 | 9/2015 |
| WO | 2015161083 | 10/2015 |

OTHER PUBLICATIONS

Artem Katasonov, et al., "Smart Semantic Middleware for the Internet of Things", Jan. 2008, 11 pages.
Andrea Zanella, et al., "Internet of Things for Smart Cities." IEEE Internet of Things Journal, vol. 1, Iss. 1, Feb. 2014, pp. 22-32.
Dieter Uckelmann, et al., "An Architectural Approach Towards the Future Internet of Things." Architecting The Internet of Things, Springer-Verlag Berlin Heidelberg, 2011, pp. 1-24.
Ning Zhong, et al., "Research challenges and perspectives on Wisdom Web of Things (W2T)." The Journal of Supercomputing, Nov. 26, 2010, 21 pages.
St. John, Jeff, "How Utilities Could Use Virtual Reality and Google Glass to Monitor the Grid," Mar. 3, 2015, 6 pages.
InfoBright, "Internet of Things Part 8: Smart Grids—the Future of Energy Delivery," 2014, 2 pages, https://www.infobright.com/index.php/internet-of-things-part-8-smart-grids-future-energy-delivery/#.VdHztvIVhBd.
Monnier, Olivier, "A Smarter Grid With the Internet of Things," Texas Instruments, Oct. 2013, 11 pages.
Devidas, A. R. and Ramesh, M. V., "Wireless Smart Grid Design for Monitoring and Optimizing Electric Transmission in India," 2010 Fourth International Conference on Sensor Technologies and Applications, Jul. 18-25, 2010, Venice, IEEE, pp. 637-640 (2 pages).
Erol-Kantarci, M. and Mouftah, H. T., "Wireless Multimedia Sensor and Actor Networks for the Next Generation Power Grid," Ad Hoc Networks, vol. 9, Issue 4, Jun. 2011, pp. 542-551 (2 pages).
Gungor, V. C., Lu, B. and Hancke, G. P., "Opportunities and Challenges of Wireless Sensor Networks in Smart Grid," IEEE Transactions on Industrial Electronics, vol. 57, No. 10, Oct. 2010, pp. 3557-3564.
Nasipuri, A. et al., "Demo Abstract: Wireless Sensor Network for Substation Monitoring: Design and Deployment," ResearchGate Conference Paper, Jan. 2008 (3 pages).
Jiang, R. et al., "Energy-theft detection issues for advanced metering infrastructure in smart grid," IEEE, Tsinghua Science and Technology, vol. 19, Issue 2, Apr. 15, 2014 (16 pages).
Blumsack, S. et al., Abstract of "Ready or not, here comes the smart grid!" Energy, vol. 37, Issue 1, Jan. 2012 (pp. 61-68).
McLaughlin, S. et al., "Energy theft in the advanced metering infrastructure," Abstract, Critical Information Infrastructures Security, Sep. 30, 2009 (pp. 176-187).
International Search Report and Written Opinion dated Jan. 25, 2017 in international patent application No. PCT/US2016/058383 (13 pages).
Lockheed Martin, "Self-Powered Ad-hoc Network", http://www.lockheedmartin.com/us/products/span.html, accessed Nov. 9, 2015.
Owada, et al., "Design for Disaster-Tolerant and Dependable Network Architecture," ICMU 2012, pp. 136-141, Information Processing Society of Japan, 2012.
Morganthaler, et al., "UAVNet: A Mobile Wireless Mesh Network Using Unmanned Aerial Vehicles," available at http://rvs.unibe.ch/research/pub_files/MBZSA12.pdf, 2012.
Snow, "Why Drones Are the Future of the Internet of Things", Dec. 1, 2014, available at https://www.suasnews.com/2014/12/why-drones-are-the-future-of-the-internet-of-things/.
Güngör, V. et al., "Smart Grid Technologies: Communication Technologies and Standards," IEEE Transactions on Industrial Informatics, vol. 7, No. 4, Nov. 2011, pp. 529-539.
Güngör, V. et al., "A Survey on Communication Networks for Electric System Automation," Feb. 2006, available at: https://smartech.gatech.edu/bitstream/handle/1853/27879/electric_system_automation.pdf.
Zaballos, A. et al., "Heterogeneous Communication Architecture for the Smart Grid," IEEE Network, vol. 25, No. 5, Sep./Oct. 2011, pp. 30-37, available at: http://www.itk.ntnu.no/fag/TTK4545/TTK2/Pensum-filer/SmartGrid.pdf.
Clark, A. et al., "Wireless Networks for the Smart Energy Grid: Application Aware Networks," Proceedings of the International MultiConference of Engineers and Computer Scientists, vol. 2, Mar. 17-19, 2010, available at: http://www.iaeng.org/publication/IMECS2010/IMECS2010_pp1243-1248.pdf.
Parikh, P. et al., "Opportunities and Challenges of Wireless Communication Technologies for Smart Grid Applications," 2010, available at: http://citeseerx.ist.psu.edu/viewdoc/download?doi=10.1.1.453.7100&rep=rep1&type=pdf.
GridSense, "Maximize Intelligence and Minimize Costs at the Distribution Level," http://www.gridsense.com/solutions-products/transformer-monitoring/distribution-transformer-monitoring/, accessed Oct. 13, 2015, 3 pages.
Balakrishnan et al., "Models for Planning Capacity Expansion in Local Access Telecommunication Networks," Massachusetts Institute of Technology Sloan School Working Paper #3048-89-MS, Aug. 1989, 88 pages.
Corte-Real et al., "Network flow models for the local access network expansion problem," Computers & Operations Research vol. 34, 2007, pp. 1141-1157.
Bauer "Bundling, Differentiation, Alliances and Mergers: Convergence Strategies in U.S. Communication Markets," Communications & Strategies, No. 60, Dec. 2005, online at http://mpra.ub.uni-muenchen.de/25151, pp. 59-93.
Balakrishnan et al., "Models for Planning the Evolution of Local Telecommunication Networks," Massachusetts Institute of Technology Operations Research Center working paper, OR195-89, May 1989, 80 pages.
"Smart meter," http://en.wikipedia,org/wiki/Smart_meter, Nov. 10, 2009, 4 pages.
Smart Grid Northwest, "Qualitrol," http://smartgridnw.org/membership/member-organizations/qualitrol/, accessed Oct. 13, 2015, 3 pages.
Amin, R. et al., "Roadmap to Smart Grid Technology: A Review of Smart Information and Communication System," International Journal of Control and Automation, vol. 7, No. 8, 2014, pp. 407-418.
Elyengui, S. et al., "The Enhancement of Communication Technologies and Networks for Smart Grid Applications," International Journal of Emerging Trends & Technology in Computer Science, vol. 2, issue 6, Nov. 2013, pp. 107-115.
Qin, Z., "A Survey of Networking Issues in Smart Grid," www.cse.wustl.edu/~jain/cse570-13/ftp/smrtgrid/index.html, Dec. 20, 2013 (12 pages).
International Search Report and Written Opinion dated Oct. 28, 2016 issued in international patent application No. PCT/US2016/045233 (10 pages).
International Search Report and Written Opinion dated Dec. 9, 2016 in international patent application No. PCT/US2016/046509 (13 pages).

(56) References Cited

OTHER PUBLICATIONS

International Search Report and Written Opinion dated Dec. 19, 2016 in international patent application No. PCT/US16/50393 (11 pages).
International Search Report and Written Opinion dated Jan. 23, 2017 in international patent application No. PCT/US2016/049245 (16 pages).
International Search Report and Written Opinion dated Jan. 19, 2017 in international patent application No. PCT/US2016/058407 (3 pages).
International Search Report and Written Opinion dated May 26, 2017 in international patent application No. PCT/US2017/019434 (10 pages).
International Search Report and Written Opinion, International Application No. PCT/US2017/46991, dated Nov. 21, 2017 (8 pages).
Hafeez et al., "Smart Home Area Networks Protocols within the Smart Grid Context", Sep. 2014, Journal of Communications, vol. 9, No. 9, pp. 665-671.
Spinsante et al., "NFC-Based User Interface for Smart Environments", Feb. 24, 2015, Hindawi Publishing Corporation, Advances in Human-Computer Interaction, vol. 15, pp. 1-12.
Modoff et al., "Industry The Internet of Things", May 6, 2014, Deutsche Bank Markets Research, (102 pages).
Tuohy, Jennifer, "What is home automation and how do I get started", Jan. 26, 2015, Network World, (9 pages).
U.S. Appl. No. 16/372,911, filed Apr. 2, 2019, "Data Transfer Facilitation to and Across A Distributed Mesh Network Using A Hybrid TV White Space, Wi-Fi and Advanced Metering Infrastructure Construct" (43 pages).
Snyder, A.F., et al., "The ANSI C12 protocol suite—updated and now with network capabilities", Mar. 2007 (available at http://horizontec.com/sccsmartgrid.2y14/2007-03ClemsonPSC02-snyder-mtgstuber.pdf) (6 pages).
Parag Kulkarni, et al., "A Mesh-Radio-Based Solution for Smart Metering Networks", IEEE Communications Magazine, Jul. 2012, 10 pages.

\* cited by examiner

DATA TRANSFER FACILITATION ACROSS A DISTRIBUTED MESH NETWORK USING LIGHT AND OPTICAL BASED TECHNOLOGY

CROSS REFERENCE TO RELATED APPLICATION

This application claims benefit to U.S. provisional application No. 62/244,919, filed 22 Oct. 2015, which is hereby incorporated by reference in its entirety.

The present invention forms part of, and builds on, the family of technologies disclosed in the other related applications identified below.

BACKGROUND OF THE INVENTION

1. Field of the Invention

The present invention relates to a transformer monitoring device for a smart grid network configured to transmit and receive optical signaling between other transformer monitoring devices and other devices in the smart grid network.

2. Brief Description of Related Art

Proliferation of the "Internet of Things" (IoT) is driving interconnected smart systems. In particular, smart grids are following this trend though the establishment of smart energy, gas and water management. Interconnected components are now providing an unprecedented level of intelligence supporting numerous operational actions. This landscape is ushering in vast amounts of unstructured data and the need for intelligent data parsing, analysis and action systems.

With this IoT understanding and backdrop, currently there is a need within global smart grid networks, e.g., in urban and remote locations with limited electric infrastructure, for communications with transformers, residential and commercial meters and other Internet/wireless connected IoT devices. These targeted locations do not have sufficient infrastructure to fully deploy a smart grid or Internet infrastructure.

SUMMARY OF THE INVENTION

There is a need within global smart grid networks, in urban and remote locations with limited electric infrastructure, for communications with transformers, residential and commercial meters and other Internet/wireless connected devices. These targeted locations do not have sufficient infrastructure to fully deploy a smart grid or Internet infrastructure. The smart grid network of the present invention provides the inclusion of wireless communications and data transmission capability into transformer monitoring modules, transformer monitoring being a core component the smart grid network. These transformer modules may be mounted directly to utility transformers in the field and include the capability to both collect and transmit information from the transformer, residential and commercial meters and other Internet/wireless connected devices. These devices differ from other existing technologies by incorporating a transceiver, transmitter and antenna collectively within the same device to both collect data from other network devices deployed in the field and communicate data back to a central location or other connected devices.

Advances in light and optical based data transmission technologies are fostering the capability for alternative networking strategies. The present invention addresses the inclusion of these technologies into a transformer monitoring device and a mesh communications network enabled by the transformer monitoring device.

Specifically, in accordance with the present invention, the inclusion of light and optics based data transfer is provided for amongst the interconnected mesh network devices. Light based communications is inclusive of, but not limited to, visible light, infrared light, laser technology, light emitting diode (LED) technology and various light-based communications schemes such as visible light communication (VLC), commonly referred to as Li-Fi.

A transformer monitoring device in accordance with the present invention incorporates a light source, optics and the software necessary to facilitate data communications along a mesh network. These hardware and software elements may be incorporated within the device housing and also provided in unmanned aerial vehicle (UAV) applications.

The transformer monitoring device of the present invention may enable the establishment of a mesh network. The mesh network is self-registering and self-correcting, allowing for individual devices to correct for the most optimal data transfer across the mesh.

Heightened security is also realized over traditional RF (radio frequency) methodologies through the device of the present invention and its enabled mesh network, due to the inherent point-to-point nature of some forms of the optical networking communications from the uplink and downlink channels. These links are a direct result of the focused beams used in some forms of the light communications methodologies and technologies. In other forms of optical networking, physical barriers, i.e. walls, are used to constrain the light communications methodologies within specific boundaries. In contrast to both, communication methodologies involving wires or cables may be easier to tap into than the light-based communication employed by the device of the present invention.

In accordance with a first aspect of the invention, an apparatus is provided comprising a receiver configured to receive optical signaling; a signal processor and a transmitter. The signal processor is configured to receive the optical signaling from the receiver, which contains information about collected data, including data related to electrical signaling being processed by a transformer located and arranged in a grid network or metered data related to associated signaling being provided from the transformer to a building or structure in the grid network; and determine corresponding optical signaling containing information about the collected data for transmitting back to a central location or other connected device for further processing, based upon the signaling received. The transmitter is configured to transmit the corresponding optical signaling.

In accordance with an embodiment of the apparatus of the first aspect of the invention, the receiver is further configured to receive optical signaling containing information about digital content requested by one or more devices locally deployed in the grid network; and the signal processor is further configured to determine corresponding optical signaling containing information about the digital content requested by the one or more devices for providing back to a central location in the grid network for further processing, based upon the optical signaling received containing information about digital content. The transmitter may further be configured to transmit the corresponding optical signaling containing information about the digital content back to the central location in the grid network for further processing. The receiver may be further configured to receive associated signaling containing information about the digital content requested back from the central location in the grid network, and the signal processor may be further configured to determine digital content optical signaling containing information about the digital content requested for providing to the one or more devices, based upon the associated signaling received. The transmitter may be further configured to provide the digital content optical signaling to the one or more devices.

In accordance with any one or more of the above-described embodiments of the first aspect of the invention, a further embodiment of the apparatus may comprise a transformer monitor, communication and data collection device having a housing with a magnet, a strap or bolt attachment for attaching the housing to a corresponding housing of the transformer located and arranged in the grid network.

In accordance with any one or more of the above-described embodiments of the first aspect of the invention, a further embodiment of the apparatus may further comprise a transformer monitor, communication and data collection device having a housing that is waterproof and environmentally sealed and that contains the signal processor therein.

In accordance with any one or more of the above-described embodiments of the first aspect of the invention, a further embodiment of the apparatus may further comprise a transformer monitor, communication and data collection device having an upper housing, a lower housing base and internal circuitry configured to implement transmission, reception, networking and data aggregation, and sensor input signal processing functionality.

In accordance with any one or more of the above-described embodiments of the first aspect of the invention, in a further embodiment of the apparatus, the metered data may be received from an electric meter associated with the building or structure, including where the metered data is received from a gas meter, or a water meter, or some combination of meters.

In accordance with any one or more of the above-described embodiments of the first aspect of the invention, in a further embodiment of the apparatus, the received optical signaling contains associated information about the distribution of the electrical signaling in the grid network.

In accordance with any one or more of the above-described embodiments of the first aspect of the invention, in a further embodiment the apparatus may be configured to establish a wireless mesh network accessible by devices in the grid network.

In accordance with any one or more of the above-described embodiments of the first aspect of the invention, in a further embodiment the apparatus may further comprise a second receiver and a second transmitter configured for cellular communication.

In accordance with any one or more of the above-described embodiments of the first aspect of the invention, in a further embodiment the apparatus may further comprise a housing with a magnet, a strap or bolt attachment for attaching the housing to an unmanned aerial vehicle.

In accordance with any one or more of the above-described embodiments of the first aspect of the invention, in a further embodiment of the apparatus, the receiver is configured to receive the optical signaling from an electric meter of the building or structure in the grid network and the optical signaling contains information about electricity usage measured by the electric meter.

In accordance with any one or more of the above-described embodiments of the first aspect of the invention, in a further embodiment of the apparatus, the transmitter of the apparatus is configured to transmit optical signaling to one or more electric meters in the grid network, instructing the electric meters to establish a wireless mesh network in the grid network.

In accordance with any one or more of the above-described embodiments of the first aspect of the invention, in a further embodiment of the apparatus, the receiver, signal processor and transmitter are configured for one or more of visible light communication, infrared light communication, laser technology communication, light emitting diode communication, or light fidelity communication.

BRIEF DESCRIPTION OF THE DRAWING

The drawing includes the following Figures, which are not necessarily drawn to scale.

In the drawing, not every element in every Figure has a reference label to reduce clutter in the drawing.

DETAILED DESCRIPTION OF THE INVENTION

Figure 1A:
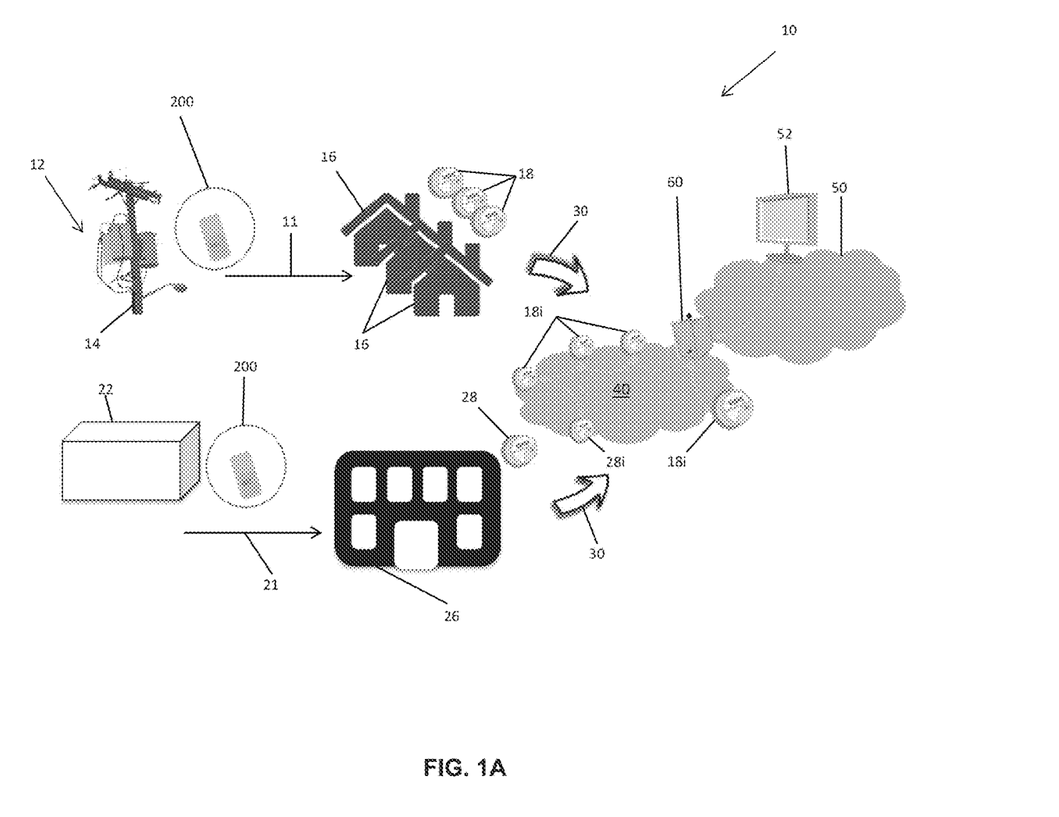
FIG. 1A is a diagram of a smart power grid network having a transformer monitor/data collection device, according to some embodiments of the present invention.
Figure 1B:
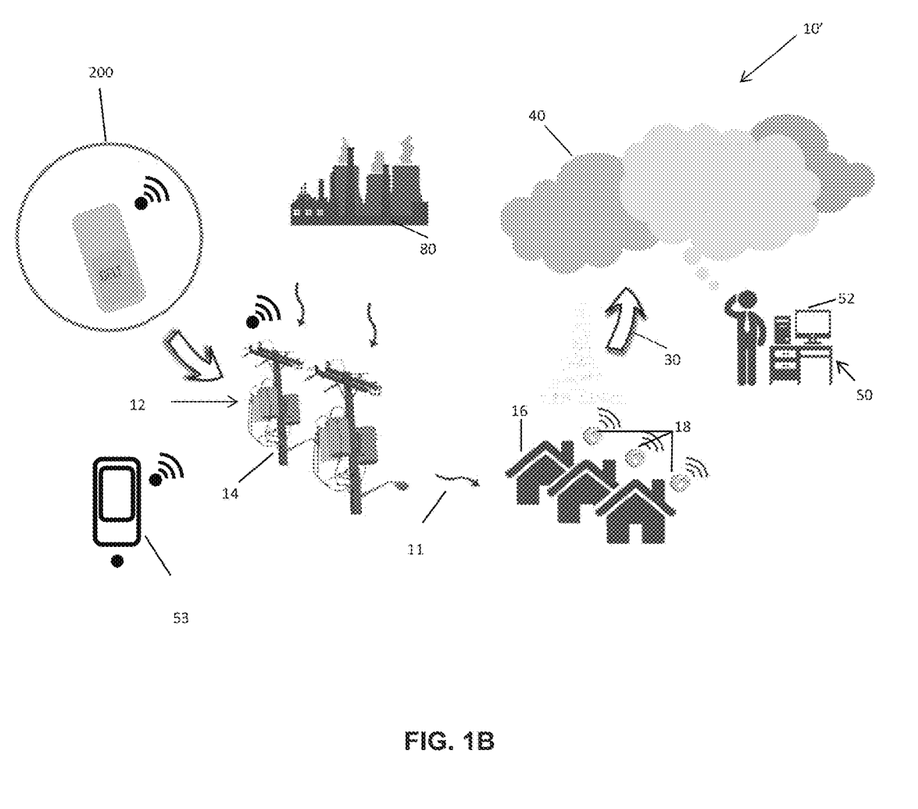
FIG. 1B is a diagram of a smart power grid network having a transformer monitor/data collection device, according to some embodiments of the present invention.

By way of example, FIGS. 1A and 1B show examples of smart power grid networks generally indicated as 10, 10', according to some embodiments of the present invention. By way of example, the smart power grid network 10. 10' may take the form of, or may be configured to include, one or more digital data and delivery and receipt mesh networks like element 40. Each digital data and delivery and receipt mesh network 40 may include one or more communication nodes such as the transformer module or device 200 for exchanging information upstream and downstream between the communication nodes and a central location, e.g., which takes the form of the private network 50 in FIGS. 1A and 1B. The one or more communication nodes may be configured to be able exchange such upstream and downstream information between themselves in order to exchange such upstream and downstream information between a respective communication node and the central location like element 50. In FIGS. 1A and 1B, similar elements are provided with similar reference labels.

In FIGS. 1A and 1B, the smart power grid network 10, 10' may include transformers like element 12 for providing electric energy to residential homes and commercial buildings like elements 16, 26, each having a respective electrical meter like elements 18, 28 for measuring the associated electrical energy usage. The smart power grid network 10, 10' may also include transformer monitor/data collection devices 200 (aka "HyperSprout") configured to collect data about the electrical energy usage in relation to residential homes and commercial buildings 16, 26 from the respective electrical meter like element 18, 28. For example, each electrical meter 18, 28 may provide metered data signaling containing information about metered data related to associated electrical signaling being supplied from the transformer 12 to the building or structure 16, 26 in the grid network 10, 10'. Moreover, transformer monitor/data collection devices 200 may receive associated signaling containing information about electrical signaling data related to electricity being processed by the transformer 12 located and arranged in the grid network 10, 10' and to which the transformer monitoring device 200 is mounted, as well as other wireless network data related to other communication nodes forming part of other wireless network devices deployed in the grid network 10, 10'. In effect, the collected data received by the transformer monitor device 200 may include some combination of the electrical signaling data related to the transformer 12, the metered data related to the electrical meter 18 and/or the other wireless network data related to other communication nodes in the grid network, e.g., which may include digital content. The digital content may include movies, songs, photographs, advertising media, social media exchanges, internet searching requests, internet searching downloads, digital imagery, web page renderings, streaming media, on-line gaming, voice over internet, video over internet, email communications, business analytics, consumer analytics, industrial automation including SCADA activities, home automation, governmental and emergency related broadcasts, digital business model facilitation, including on-line commerce.

The transformer monitor/data collection devices 200 may also be configured to provide suitable signaling 30 containing information about the collected data to the private network 50 via the digital data and delivery and receipt mesh network 40. The private network 50 may be configured as a central point that processes the collected data, e.g., performing utility analysis that may include one or more of the following: delivery subtraction analysis, proactive asset monitoring, distribution asset utilization, T and D subtraction analysis, energy audits and analysis, load control, geographic localization and define pro-active and pre-emptive asset efficiency or operational activities. By way of example, the utility analysis may be performed in an effort to increase efficiency, decrease costs, increase profits and/or community engagement related to the operation of the smart grid network.

The pole mounted transformer device 200 may be configured in communication with the electrical meter 18 associated with the residential home 16 (FIG. 1B). By way of example, the electrical meter 18 may be configured to measure single phase electrical energy provided by the transformer 12 along a single phase utility line 11 to the residential home 16.

In comparison, the pole mounted transformer device 200 may also include, or take the form of, a pad mounted transformer device 200 (FIG. 1A) in communications with an electrical meter 28 associated with a commercial building generally indicated as 26. By way of example, the electrical meter 28 may be configured to measure three (3) phase electrical energy provided by the pad transformer 22 along a three (3) phase utility line 21 to the commercial building 26. In FIG. 1B, a power utility 80 may be configured to provide the electrical energy in the smart grid network 10'.

FIG. 1B shows that the transformer device 200 may be configured to collect data related to some distribution related functionality, e.g., including determinations related to outage, momentary outage, voltage/VAR, and/or transformer monitoring. FIG. 1B shows that the transformer device 200 may be configured to collect data related to some voltage analysis, DRM functionality and energy theft functionality in relation to its associated residential home or commercial building. The transformer device 200 can provide the suitable signaling 30 containing information about the collected data to the private network 50 via the digital data and delivery and receipt mesh network 40. The collected data received by the private network 50 may also be analyzed in relation to conservation, load curtailment and/or a demand response vis-a-vis the power utility 80. In FIG. 1B, the private network 50 may include a private network computer and monitor generally indicated as 52 for performing or implementing the aforementioned analysis and functionality.

FIG. 1A shows that the digital data and delivery and receipt mesh network 40 may include other transformer devices like element 200 exchanging information with other meters like elements 18$i$, 28$i$ associated with other buildings or structures like elements 16, 26. The mesh network 40 can be enabled and established using the optical-based communications system enabled by the transformer monitor device 200 of the present invention, as described further in reference to FIGS. 2-4.

FIG. 1A also shows a relay 60 coupled between the digital data and delivery and receipt mesh network 40 and the private network 50.

Figure 2A:
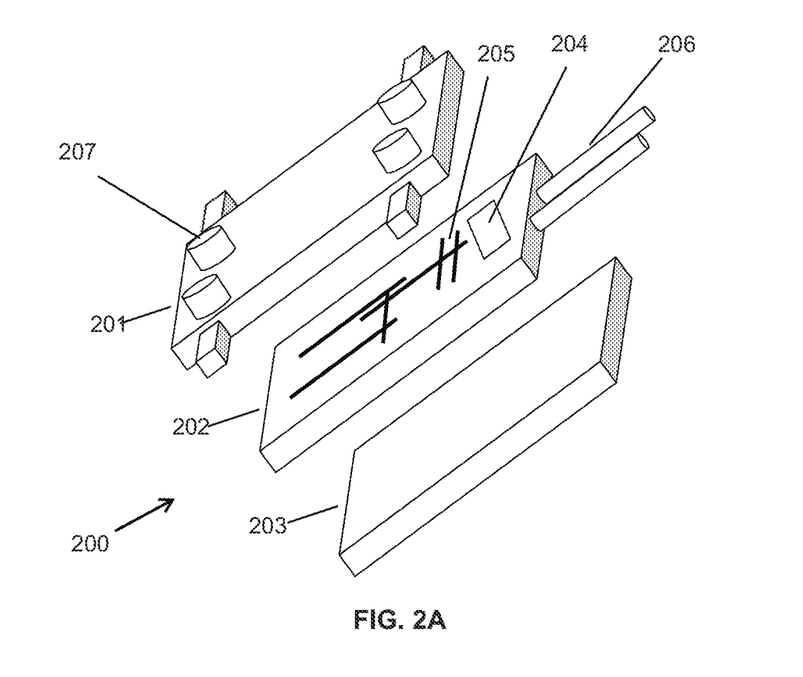
FIG. 2A is a diagram of an apparatus in accordance with an embodiment of the present invention.

FIG. 2A shows an embodiment of the transformer monitor/data collection device 200, having an upper housing 201, internal circuitry 202 and a lower housing base 203.

The device 200 is configured for light-based communications, including but not limited to visible light, infrared light, laser technology, LED technology and various light-based communications schemes such as VLC or Li-Fi. Light controlling optics 205 may be built into the internal circuitry 202, incorporated directly into the upper housing 201 or housing base 203, or may be located externally to the housing.

By way of example, the internal circuitry 202 may be configured inclusive of transmission, reception, networking, data aggregation, sensor input, among other requirements for implementing signal processing functionality in relation to the same. For example, any signal processing functionality may be implemented using a signal processor like element 204, consistent with that set forth herein and described in further detail below.

In particular, the internal circuitry 202 may be configured to implement transmission/reception signal processing functionality, e.g., for exchanging suitable transmission/reception signaling to/from other communication nodes in the smart grid network, or to/from the central location or other connection device like element 50 for further processing, including in relation to some combination of either a cloud network, or a digital data and delivery and receipt mesh network 40, or by using a smart node power grid communication protocol, consistent with that set forth herein.

Further, the internal circuitry 202 may also be configured to implement networking and data aggregation signal processing functionality, e.g., for exchanging suitable networking and data aggregation signaling received to/from other communication nodes in the smart grid network, or to/from the central location or other connection device for further processing, including in relation to some combination of either the cloud network, or the digital data and delivery and receipt mesh network, or by using the smart node power grid communication protocol.

Furthermore, the internal circuitry 202 may also be configured to implement sensor input signal processing functionality, e.g., for exchanging suitable sensor input signaling containing information about sensed input information received by the transformer monitor/data collection device 200 to/from the electric meter 18, 28 of the residential home or commercial building, or to/from the transformer 12, 22.

The device 200 may comprise one or more external light receptors and transmitters 207, which are configured to receive and transmit optical signals. Other transformer monitoring devices 200 in a network 10 and other devices in the network 10 such as electric meters 18 or other IoT devices 53 may be similarly configured to comprise external light receptors and transmitters to receive and transmit optical signals. The transformer monitoring device 200 can therefore communicate with other transformer monitoring devices 200 and other devices in the smart grid network 10 using a light based communication. The transmitter 207 may include, for example a beam generator, which is configured to generate a light beam comprising signaling containing information, which is transmitted from a device 200 to a further device 200, which receives the signal via receptor 207 and processes the signal using the signal processor 204. The device 200 of the invention does not require fiber optic cables for signal transmission. Further, one or more transformer monitoring devices 200 can be used to implement an optical-based mesh network 40 within a smart grid network 10.

The use of light-based communication from the transformer monitor device 200 provides for a communication means that has a higher throughput and range than other communications methods, such as cellular. For example, the range of light-based communications with the device 200 may be five times greater, or more, than cellular-based devices, depending upon the optical networking technology utilized. Furthermore, whereas throughput with a Wi-Fi-based device could exceed 54 Mbps, the light-based communications of the device 200 enables a throughput of over 1.2 Gbps, depending upon the optical networking technology utilized.

The device 200 may be configured to use one or more light-based communication technologies, and may be configured to vary between types of communication depending on the particular usage. For example, for a long range communication between two devices 200, laser technology may be most suitable. However, for a short range communication between two devices 200, Li-Fi may be the most suitable method of communication.

The transformer monitor device 200 may further comprise a memory or non-transitory computer readable medium. The memory may be configured to store information that is received or transmitted by the light-based communication of the transformer monitor device. Further, the memory may be stored with appropriate programming, which when executed by the signal processor 204 of the transformer monitor device, is configured to enable the transformer monitor device to transmit and receive light-based communications, as would be understood by persons having ordinary skill in the art.

The transformer monitor device 200 may enable the establishment of a hybrid network within the smart grid network 10, which may include at least three different types of communication capabilities. First, the devices 200 may be configured to create an optical network, as previously described. In an optical network, devices 200, as well as other devices in a smart grid network 10, such as electric meters 18 and IoT devices 53, having optical transmission and receiving capabilities may communicate with one another. Such an optical network allows for communication of signals and data at a high bandwidth and range. Additionally, the device 200 may be further configured for cellular communication. The device 200 is configured to send and receive signaling to and from a cellular tower and from cellular devices in the smart grid network 10. Furthermore, the device 200 may be configured to create a wireless or Wi-Fi network, which can be used for communication with or between electric meters 18 and IoT devices 53, which in certain instances may not be configured for optical or light-based communication. The creation of a Wi-Fi network by the device 200 or a series of devices 200 enables communication between such legacy devices.

Figure 2B:
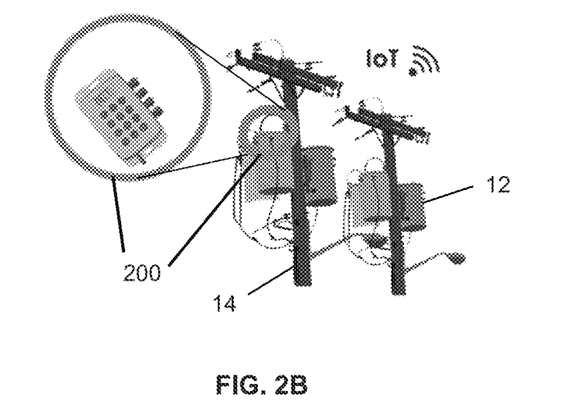
FIG. 2B is a diagram of an apparatus in accordance with an embodiment of the present invention, installed on a utility transformer.
Figure 2C:
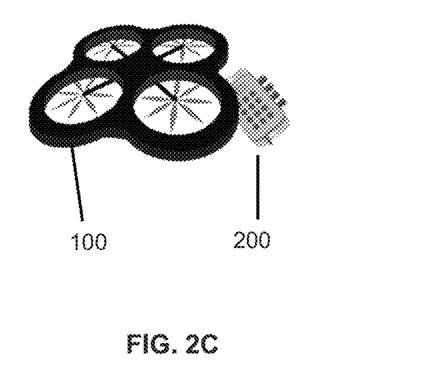
FIG. 2C is a diagram of an apparatus in accordance with an embodiment of the present invention, installed on an unmanned aerial vehicle.

The upper housing 201 or the housing base 203 may be attached to a pole-mounted transformer 12 or the utility pole 14 itself, to attach the device 200 to the transformer 12, as shown for example in FIG. 2B, e.g., by being configured for magnetic attachment, bolt attachment, a strap, or other methodologies. In alternative embodiments, the upper housing 201 or the housing base 203 may be attached to an unmanned aerial vehicle (UAV) 100 to attach the device 200 to the UAV 100, as shown for example in FIG. 2C. The scope of the invention is not intended to be limited to the type or kind of attachment; and embodiments are envisioned using, and the scope of the invention is intended to include, other types or kinds of attachment techniques either now known or later developed in the future within the spirit of the present invention.

The upper housing 201 and the lower housing base 203 may be combined together to form an assembled housing having the internal circuitry 202 therein. By way of example, the assembled housing may be hermetically sealed against the ingress of environmental elements, e.g., like water, moisture, dust, particles, etc. All interconnect ports may be sealed. The assembled housing may be configured to provide protection for reducing electromagnetic interference (EMI), e.g., from the transformer or other EMI emitting devices within range. The assembled housing may also be configured for easy transport, attachment, detachment and decommissioning, e.g., in relation to a utility pole or some other structure.

In the transformer monitor/data collection device 200, external cables 206 may be configured for data and/or device power. Alternatively, the transformer monitor/data collection device 200 may also have an accommodation for wireless power transfer via inductance or tuned magnetic resonances. These data and power functionalities are provided by way of example; and the scope of the invention is not intended to be limited to the type or kind of data or power functionality implementation; and embodiments are envisioned using, and the scope of the invention is intended to include, other types or kinds of data or power functionality implementation either now known or later developed in the future within the spirit of the present invention.

The overall smart power grid network 10 according to the present invention represents an interconnected so-called "BIG DATA" technology system providing advanced intelligence and synergistic components across power metering, distribution and communication, optimization and installation and servicing. The network incorporates discrete elements in the transformer monitoring and communications, residential and commercial metering and analytical, predictive and pre-emptive software algorithms. The hardware associated with the network facilitates communications with transformers, residential and commercial meters, and other Internet/wireless connected devices. The network's geographically disbursed assets support a wireless mesh network communications extension, while aiding system optimization capabilities, noting that many assets are in logistically difficult areas to reference, re-locate, interrogate and service. The overall integrated system drives substantial efficiencies in data visualization, evaluation, diagnosis, optimization, and servicing using enhanced reality systems across this interconnected smart grid network and similar networks. The collective systems provide a synergistic and unique alternative network for BtB/BtC data receipt and delivery.

Figure 3:
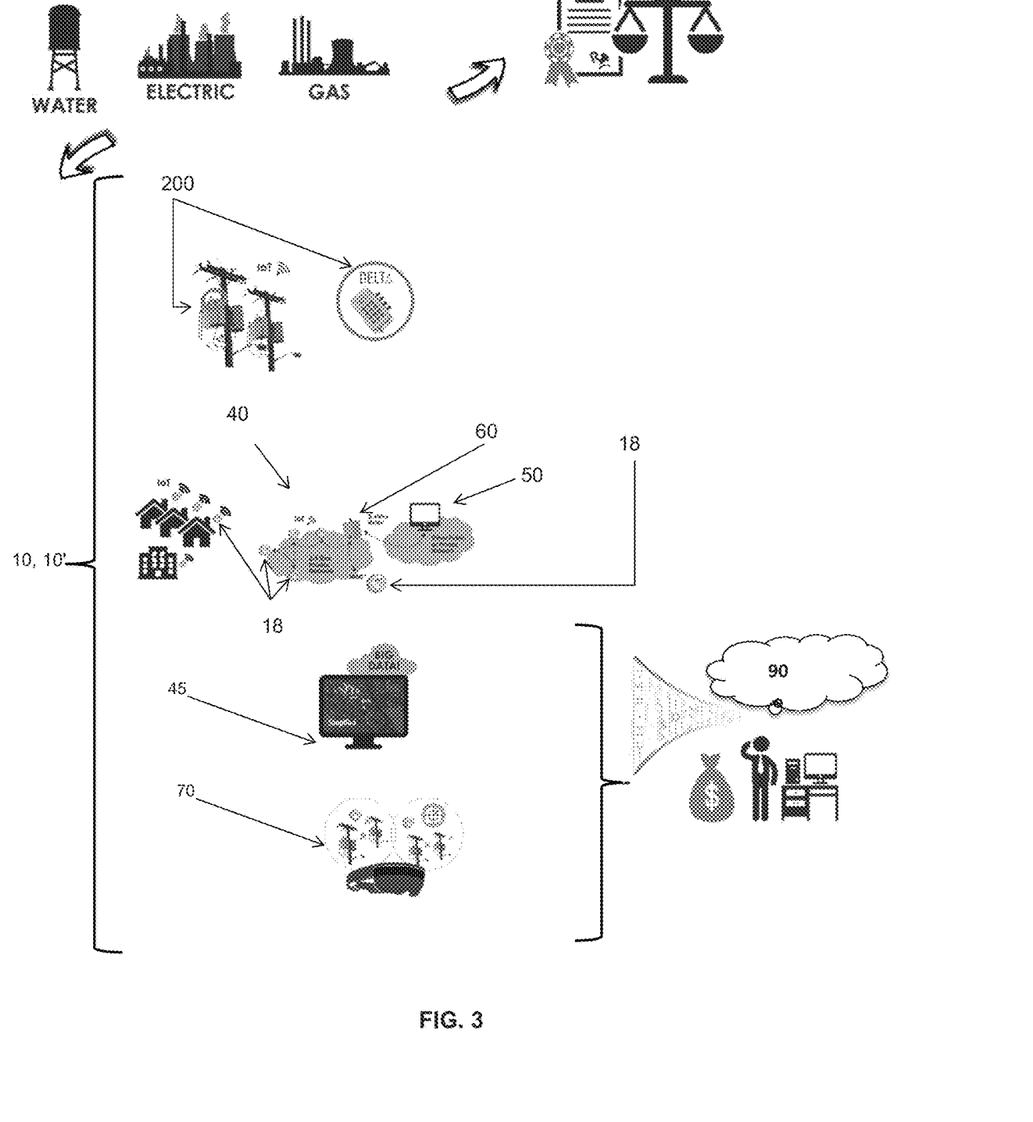
FIG. 3 is a diagram showing an establishment of a baseline, power grid centric, smart utility mesh network, according to some embodiments of the present invention.

A further example of an implementation of a smart grid network 10 is shown in FIG. 3. The smart grid network 10 according to the present invention represents a singular, standardized, and scalable network, providing the industry's first inclusive solution from a singular supplier. The smart grid network 10 may incorporate a utility financials rebalancing, and incorporate utility customers and IoT adjacencies. The smart grid network 10 is inclusive of four basic technology elements. The primary hardware and software constituents of the network are as noted and identified below.

1. The pole or pad mounted transformer monitor/smart data collector device is identified herein as element 200, according to the present invention (AKA as "HyperSprout™"), which is the localized data aggregation and power flow investigation; establishing a data capture and delivery capability wherever there is power, e.g., consistent with that set forth herein.

2. A digital data and delivery and receipt wireless mesh network (AKA "DataVINE™") is identified herein as element 40, which is a ubiquitous mesh network facilitating automated residential and commercial metering while deploying an alternative data delivery capability; enforcing a market-leading 100% meter read capability, e.g., consistent with that set forth in U.S. application Ser. No. 15/250,119.

3. A smart node power grid communication protocol (AKA "DataSCAPE™"), identified herein as element 45, which provides for a comprehensive nodal exchange analysis of all grid parameters; realizing an inclusive geo-spatial understanding of utility operations, e.g., consistent with that set forth in U.S. provisional application Ser. No. 62/375,170.

4. A head-mounted user device 70 for enhanced reality field investigation, interaction and servicing; deploying the industry's first "virtual" utility (AKA "PowerVISR™"), e.g., consistent with that set forth in U.S. patent application Ser. No. 15/234,293.

As previously described, the present invention represents a new and unique inclusion of optical and light-based communications and data transmission capability into transformer monitoring modules like element 200, transformer monitoring being a core component within a so-called smart grid network like element 10. These transformer modules 200 may be mounted directly to utility transformers 12 in the field and include the capability to both collect and transmit information from the transformer 12, residential and commercial meters like element 18 and other Internet/wireless connected devices in the network 10.

The smart grid network 10 and the mesh network 40 enabled by the device 200 and other network devices provide network access to an end user. Additionally, the end user may use the established network for the purpose of storing and retrieving data and files from a cloud-based server 90.

Figure 4:
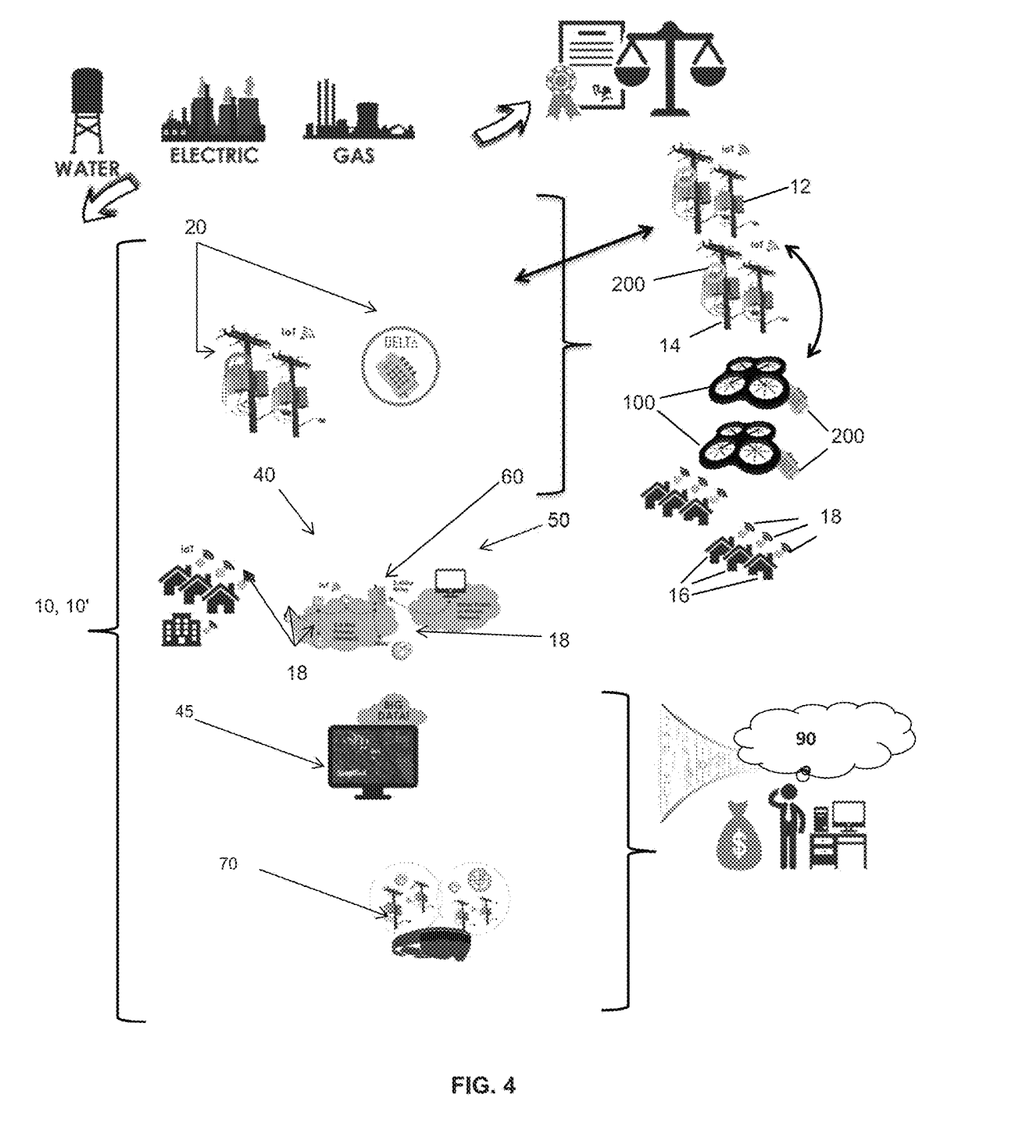
FIG. 4 is a diagram of the evolution of a baseline, power grid centric, smart utility mesh network using the apparatus in accordance with an embodiment of the present invention.

A further example of a smart grid network 10 and mesh network 40 incorporating the transformer monitoring device 200 of the present invention is shown in FIG. 4.

As shown in FIG. 4, the transformer monitoring device 200 may be provided to upgrade existing smart grid networks 10 that do not incorporate such transformer monitoring devices 200 configured for optical communication. For example, in a network 10 that includes transformer monitoring devices 20, which may not be configured for optical communication, such devices 20 may be replaced or supplemented by transformer monitoring devices 200 to enable optical communication between devices within the smart grid network 10 and mesh network 40. In addition, if transformers 12 and utility poles 14 are unavailable in a particular environment, or are inaccessible in an emergency scenario, the transformer monitoring devices 200 may be deployed in a smart grid network 10 using one or more UAVs 100. The UAV 100-mounted transformer monitoring devices 200 may enable the establishment of a mesh network 40 and communication between devices in the mesh network 40, as described herein.

The optical-based communication mechanisms of the transformer monitoring device 200 may be utilized in a variety of scenarios in a smart grid network 10. In one example, the transformer monitoring device 200 may be in communication with a device, such as a server located at a location a long distance from the transformer monitoring device 200. A focused beam containing signaling can be transmitted from the server to the transformer monitoring device 200, or to multiple transformer monitoring devices 200. The transformer monitoring device(s) 200 can create a mesh network 40, in the form of a Wi-Fi network bubble, to service the smart grid network 10. In another example, a focused beam containing signaling can be transmitted from a distant location to the transformer monitoring device 200, or to multiple transformer monitoring devices 200, and the transformer monitoring device(s) 200 can transmit a light-based signal to devices in the smart grid network 10, such as electric meters 18. The electric meters 18 may then create a mesh network 40, in the form of a Wi-Fi network bubble. In other embodiments, the electric meters 18 having optical communication capability may broadcast broad optical signals to consumer products or IoT devices 53, configured for optical communication. Further, as previously described, the transformer monitoring device 200 may be configured for creation of and use in a hybrid network, including optical, cellular, RF and Wi-Fi communication.

OTHER RELATED APPLICATIONS

The application is related to other patent applications, some of which are identified above, that together form part of the overall family of technologies developed by one or more of the inventors herein, and disclosed in the following applications:

U.S. patent application Ser. No. 15/160,754, filed 20 May 2016, entitled "Transformer mounted monitor, communications and data collection device," which claims benefit to U.S. provisional application No. 62/203,101, filed 10 Aug. 2015, having a similar title;

U.S. patent application Ser. No. 15/234,293, filed 11 Aug. 2016, entitled "Enhanced reality system for visualizing, evaluating, diagnosing, optimizing and servicing smart grids and incorporated components," which claims benefit to U.S. provisional application Ser. No. 62/203,719, filed 11 Aug. 2015, having a similar title;

U.S. provisional application Ser. No. 62/375,170, filed 15 Aug. 2016, entitled "Integrated solution of Internet of Things, DSGN™ and iDAP™ pertaining to Communication, Data and Asset Serialization";

U.S. application Ser. No. 15/257,302 filed 6 Sep. 2016, entitled "System and Method for Determination and Remediation of Energy Diversion in a Smart Grid Network", which claims the benefit of U.S. provisional application Ser. No. 62/213,815, filed 3 Sep. 2015, having a similar title;

U.S. application Ser. No. 15/250,119 filed 29 Aug. 2016, entitled "Supplemental And Alternative Digital Data Delivery and Receipt Mesh Network Realized Through the Placement of Enhanced Transformer Mounted Monitoring Devices", which claims the benefit of U.S. provisional application Ser. No. 62/236,420 filed 2 Oct. 2015, having the same title;

U.S. provisional application Ser. No. 62/244,914, filed 22 Oct. 2015, entitled "Augmentation, expansion and self-healing of a geographically distributed mesh network using unmanned aerial vehicle (UAV) technology;" and U.S. provisional application Ser. No. 62/299,348, filed 24 Feb. 2016, entitled "Distributed 802.11s mesh network using HYPERSPROUT hardware for the capture and transmission of data;"

which are all assigned to the assignee of the instant patent application, and which are all incorporated by reference in their entirety.

THE SCOPE OF THE INVENTION

It should be understood that, unless stated otherwise herein, any of the features, characteristics, alternatives or modifications described regarding a particular embodiment herein may also be applied, used, or incorporated with any other embodiment described herein. Also, the drawing herein may not be drawn to scale in whole or in part. Although the invention has been described and illustrated with respect to exemplary embodiments thereof, the foregoing and various other additions and omissions may be made therein and thereto without departing from the spirit and scope of the present invention.

What we claim is:

1. An apparatus comprising:
a signal processor configured to receive signaling comprising data relating to electricity being processed by a transformer in a grid network;
a receiver configured to receive optical signaling comprising metered data received from one or more smart meters in the grid network; and
a transmitter configured to transmit optical signaling to the one or more smart meters in the grid network, instructing the one or more smart meters to establish a wireless mesh network between the apparatus and the one or more smart meters to which end user devices can join, wherein the wireless mesh network provides an internet connection for said end user devices,
wherein the receiver is further configured to receive further optical signaling comprising other wireless network data originating from at least one of said end user devices in the wireless mesh network.

2. The apparatus according to claim 1, wherein the further optical signaling comprises information about digital content requested by the at least one end user device; and the signal processor is further configured to determine corresponding optical signaling containing information about the digital content requested by the at least one end user device for providing back to a central location in the grid network or a de-centralized location outside the grid network for further processing, based upon the further optical signaling received containing information about digital content.

3. The apparatus according to claim 2, wherein the transmitter is further configured to transmit the corresponding optical signaling containing information about the digital content back to the central location in the grid network or the de-centralized location outside the grid network for further processing; and
wherein the receiver is further configured to receive associated optical signaling containing information about the digital content requested back from the central location in the grid network or the de-centralized location outside the grid network; and the signal processor is further configured to determine digital content optical signaling containing information about the digital content requested for providing to the one or more devices, based upon the associated optical signaling received.

4. The apparatus according to claim 1, wherein the apparatus comprises a transformer monitor, communication and data collection device having a housing with a magnet, strap or bolt attachment for attaching the housing to a corresponding housing of the transformer located and arranged in the grid network.

5. The apparatus according to claim 1, wherein the apparatus comprises a transformer monitor, communication and data collection device having an upper housing, a lower housing base and internal circuitry configured to implement transmission, reception, networking and data aggregation, and sensor input signal processing functionality.

6. The apparatus according to claim 1, wherein the one or more smart meters comprises one or more of an electric meter, a gas meter, or a water meter associated with the building or structure.

7. The apparatus according to claim 1, further comprising:
a second receiver and a second transmitter configured for cellular communication.

8. The apparatus of claim 1, wherein the receiver is configured to receive said optical signaling from an electric meter of the building or structure in the grid network and said optical signaling contains information about electricity usage measured by the electric meter.

9. The apparatus of claim 1, wherein the receiver, signal processor and transmitter are configured for one or more of visible light communication, infrared light communication, laser technology communication, light emitting diode communication, or light fidelity communication.

10. The apparatus of claim 1, wherein the receiver is configured to wirelessly receive said optical signaling and the transmitter is configured to wirelessly transmit said corresponding optical signaling.

11. The apparatus of claim 1, wherein said digital content comprises one or more of video content, photographic content, digital imagery, audio content, web page renderings and data, streaming media, internet searches and email communications.

12. The apparatus according to claim 1, wherein the wireless mesh network is configured to be a Wi-Fi network to provide Internet access to the end user devices in the grid network, wherein the one or more smart meters broadcast a Wi-Fi radio frequency signal received by the end user devices enabling the end user devices to join the Wi-Fi network.

13. The apparatus according to claim 12, wherein the receiver is further configured to receive the further optical signaling from the one or more smart meters, the further optical signaling comprising other wireless network data originating from at least one of said end user devices in the Wi-Fi network.

14. The apparatus according to claim 1, wherein the wireless mesh network is configured to be an optical network to provide Internet access to the end user devices, wherein the one or more smart meters broadcast optical network signaling received by end user devices configured to receive and transmit wireless optical signaling.

15. The apparatus according to claim 14, wherein the receiver is further configured to receive the further optical signaling from at least one end user device in the optical network.

16. The apparatus according to claim 1, wherein the receiver is further configured to receive a focused light beam comprising data from a central location and the transmitter is configured to optically transmit the data to one or more of the one or more smart meters and the end user devices.

17. The apparatus according to claim 1, wherein the transmitter is further configured to transmit to a central location optical signaling comprising the data relating to electricity being processed by the transformer and the metered data received from one or more smart meters in the grid network, and the receiver is configured to receive optical signaling from the central location relating to the transmitted metered data and data relating to electricity being processed by the transformer.

18. A system comprising:
   an apparatus comprising:
      a signal processor configured to receive signaling comprising data relating to electricity being processed by a transformer in a grid network;
      a receiver; and
      a transmitter;
   one or more smart utility meters; and
   at least one end user device;
   wherein the receiver of the apparatus is configured to receive optical signaling comprising metered data received from one or more smart utility meters;
   wherein the transmitter is configured to transmit optical signaling to the one or more smart utility meters, instructing the one or more smart utility meters to establish a wireless mesh network between the apparatus and the one or more smart utility meters to which the at least one end user device can join, wherein the wireless mesh network provides an internet connection for said at least one end user device; and
   wherein the further optical signaling comprising other wireless network data originating from the at least one end user device in the wireless mesh network.

19. The system according to claim 18, wherein the wireless mesh network is configured to be a Wi-Fi network to provide Internet access to the at least one end user device, wherein the one or more smart utility meters broadcast a Wi-Fi radio frequency signal received by the at least one end user device enabling the at least one end user device to join the Wi-Fi network; and
   wherein the receiver is further configured to receive the further optical signaling from the one or more smart utility meters, the further optical signaling comprising other wireless network data originating from the at least one end user device in the Wi-Fi network.

20. The system according to claim 18, wherein the wireless mesh network is configured to be an optical network to provide Internet access to the at least one end user device, wherein the one or more smart utility meters broadcast optical network signaling received by the at least one end user device configured to receive and transmit wireless optical signaling; and
   wherein the receiver is further configured to receive the further optical signaling from the at least one end user device in the optical network.

* * * * *

UNITED STATES PATENT AND TRADEMARK OFFICE
CERTIFICATE OF CORRECTION

PATENT NO. : 10,476,597 B2
APPLICATION NO. : 15/332151
DATED : November 12, 2019
INVENTOR(S) : Scott Foster and Keith Teichmann It is certified that error appears in the above-identified patent and that said Letters Patent is hereby corrected as shown below:

In Claim 18 Column 14, Line 12, insert --receiver is further configured to receive-- after "wherein the".

Signed and Sealed this
Seventeenth Day of December, 2019

Andrei Iancu
*Director of the United States Patent and Trademark Office*